(12) United States Patent
Wong

(10) Patent No.: US 10,803,591 B2
(45) Date of Patent: Oct. 13, 2020

(54) 3D SEGMENTATION WITH EXPONENTIAL LOGARITHMIC LOSS FOR HIGHLY UNBALANCED OBJECT SIZES

(71) Applicant: INTERNATIONAL BUSINESS MACHINES CORPORATION, Armonk, NY (US)

(72) Inventor: Chun Lok Wong, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

(21) Appl. No.: 16/114,947

(22) Filed: Aug. 28, 2018

(65) Prior Publication Data

US 2020/0074637 A1 Mar. 5, 2020

(51) Int. Cl.
G06T 7/143 (2017.01)
G06T 7/00 (2017.01)
G06N 3/04 (2006.01)
G06N 3/08 (2006.01)

(52) U.S. Cl.
CPC .......... *G06T 7/143* (2017.01); *G06N 3/0472* (2013.01); *G06N 3/084* (2013.01); *G06T 7/0012* (2013.01)

(58) Field of Classification Search
CPC ....... G06T 7/0012; G06T 7/0014; G06T 7/10; G06T 7/143; G06N 3/02; G06N 3/0472; G06N 3/08; G06N 3/084
See application file for complete search history.

(56) References Cited

U.S. PATENT DOCUMENTS

2019/0102678 A1* 4/2019 Chang ................... G06N 3/084
2019/0318474 A1* 10/2019 Han ..................... G06K 9/6267

OTHER PUBLICATIONS

Shen et al., On the influence of Dice loss function in multi-class organ segmentation of abdominal CT using 3D fully convolutional networks, presented at MI-ken, Nov. 2017, Takamatsu, Japan , arXiv: 1801.05912v1 [cs.CV], Jan. 2018 (Year: 2018).*
Fidon et al., "Generalised Wasserstein Dice Score for Imbalance Multi-class Segmentation using Holistic Convolutional Networks," BrainLes 2017: Brainlesion: Glioma, Multiple Sclerosis, Stroke and Traumatic Brain Injuries, pp. 64-76 (2018).
Hashemi et al., "Asymmetric Similarity Loss Function to Balance Precision and Recall in Highly Unbalanced Deep Medical Image Segmentation," arXiv:1803.11078v2 [cs.CV] Apr. 17, 2018.

(Continued)

*Primary Examiner* — Said M Elnoubi
(74) *Attorney, Agent, or Firm* — Erik Huestis; Stephen Kenny; Foley Hoag LLP

(57) ABSTRACT

3D segmentation with exponential logarithmic loss for highly unbalanced object sizes is provided. In various embodiments, an artificial neural network is trained to label an anatomical feature in medical imagery by: i) providing at least one medical image to the artificial neural network; ii) determining from the artificial neural network a predicted segmentation for the at least one medical image; iii) comparing the predicted segmentation to ground truth segmentation, and computing therefrom a loss function, the loss function having an exponential-logarithmic term; and iv) updating the artificial neural network based on the loss function.

20 Claims, 9 Drawing Sheets

(56) References Cited

OTHER PUBLICATIONS

Lin et al., "Focal Loss for Dense Object Detection," IEEE Transactions on Pattern Analysis and Machine Intelligence (2018).
Milletari et al., "V-Net: Fully Convolutional Neural Networks for Volumetric Medical Image Segmentation," 2016 Fourth International Conference on 3D Vision (3DV) (2016).
Patravali et al., "2D-3D Fully Convolutional Neural Networks for Cardiac MR Segmentation," STACOM 2017: Statistica Atlases and Computational Models of the Heart. ACDC and MMWHS Challenges, pp. 130-139 (2018).
Ronneberger et al., "U-Net: Convolutional Networks for Biomedical Image Segmentation," International Conference on Medical Image Computing and Computer-Assisted Intervention, MICCAI 2015, pp. 2334-2241 (2015).
Roth et al., "An Application of Cascaded 3D Fully Convolutional Networks for Medical Image Segmentation," Computerized Medical Imagining and Graphics, 66:90-99 (2018).
Roy et al., "Error Corrective Boosting for Learning Fully Convolutional Networks with Limited Data," International Conference on Medical Image Computing and Computer-Assisted Intervention, MICCAI 2017, pp. 231-239 (2017).

* cited by examiner

V-Net ($\gamma = 0.3$)
Dice = 65%

US 10,803,591 B2

3D SEGMENTATION WITH EXPONENTIAL LOGARITHMIC LOSS FOR HIGHLY UNBALANCED OBJECT SIZES

BACKGROUND

Embodiments of the present disclosure relate artificial neural networks for image segmentation, and more specifically, to 3D segmentation with exponential logarithmic loss for highly unbalanced object sizes.

BRIEF SUMMARY

According to embodiments of the present disclosure, methods of and computer program products for labeling anatomical features in medical imagery are provided. In various embodiments, an artificial neural network is trained to label an anatomical feature in medical imagery by: i) providing at least one medical image to the artificial neural network; ii) determining from the artificial neural network a predicted segmentation for the at least one medical image; iii) comparing the predicted segmentation to ground truth segmentation, and computing therefrom a loss function, the loss function having an exponential-logarithmic term; and iv) updating the artificial neural network based on the loss function.

DETAILED DESCRIPTION

Figure 1:
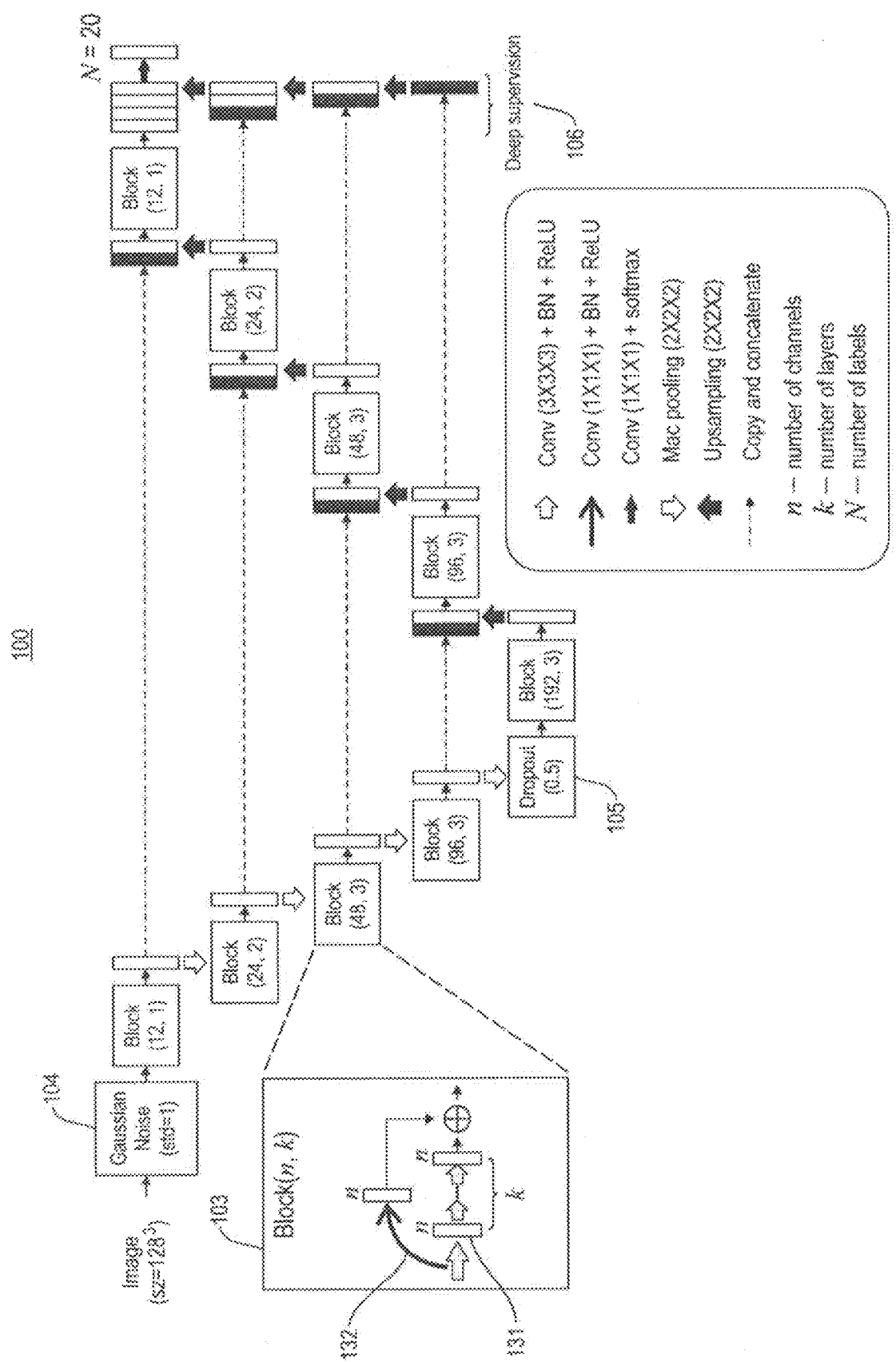
FIG. 1 illustrates a network architecture for 3D segmentation according to embodiments of the present disclosure.

Fully convolutional neural networks (CNNs) are advantageous for medical image segmentation on both speed and accuracy. Various CNNs may be used for 2D and 3D segmentation. However, such networks only handle relatively small numbers of labels (e.g., <10), and do not effectively handle highly unbalanced object sizes, especially in 3D segmentation.

To address these and other shortcomings of alternative approaches, the present disclosure provides network architectures and corresponding loss functions that improve segmentation of very small structures. By combining skip connections and deep supervision with respect to the computational feasibility of 3D segmentation, a fast converging and computationally efficient network architecture is provided for accurate segmentation. In various embodiments, an exponential logarithmic loss is provided that balances the labels not only by their relative sizes but also by their segmentation difficulties. In exemplary embodiments described below, an average Dice coefficient of 82% is achieved on brain segmentation with 20 labels, with the ratio of the smallest to largest object sizes as 0.14%. Less than 100 epochs are required to reach such accuracy, and segmenting a 128×128×128 volume only takes around 0.4 s.

As noted above, various CNNs may be used segment various anatomies such as the heart, brain, liver, and prostate from computed tomography images and magnetic resonance (MR) images. However, 3D CNN image segmentation is still challenging. Alternative networks are applied on datasets with small numbers of labels (e.g., <10), especially in 3D segmentation. When more detailed segmentation is required with more anatomical structures, issues such as computational feasibility and highly unbalanced object sizes need to be addressed by new network architectures and algorithms.

Various approaches may be taken to address highly unbalanced labels. For example, a 2D network architecture may be used to segment all slices of a 3D brain volume with highly unbalanced labels, in combination with error corrective boosting to compute label weights that emphasize parameter updates on classes with lower validation accuracy. In such an approach, the label weights computed from the validation set are only applicable to the weighted cross-entropy term of the loss function. Furthermore, the network architecture may be computationally inefficient for 3D segmentation and the stacking of 2D results for 3D segmentation may result in inconsistency among consecutive slices.

In another approach, the generalized Dice loss may be used as the loss function. Instead of computing the Dice coefficient of each label, this loss function first computes the weighted sum of the intersection and the weighted sum of the union between the ground truth and prediction, with the weights inversely proportional to the label frequencies. The resulting intersection and union are then combined for the generalized Dice loss. The Dice coefficient is unfavorable to small structures, as a few pixels of misclassification can lead to a large decrease of the coefficient, and this sensitivity is irrelevant to the relative sizes among structures. Therefore, balancing by label frequencies is non-optimal for Dice losses.

To address the issues of highly unbalanced object sizes and computational efficiency in 3D segmentation, various embodiments use the exponential logarithmic loss function. In addition, various embodiments provide a fast converging and computationally efficient network architecture that combines the advantages of skip connections and deep supervision, which has only about 1/14 of the parameters of, and is twice as fast as, the V-Net.

In various embodiments, the loss function comprises the logarithmic Dice loss, which intrinsically focuses more on less accurately segmented structures. The nonlinearities of the logarithmic Dice loss and the weighted cross-entropy can be further controlled by the exponential parameters. In this manner, the network can achieve accurate segmentation on both small and large structures.

As set out below, experiments were performed on brain MR images with 20 highly unbalanced labels. Combining the loss function and network architecture can achieve an average Dice coefficient of 82% with the average segmentation time as 0.4 s.

Referring to FIG. 1, a network architecture for 3D segmentation is illustrated according to embodiments of the present disclosure. Solid blocks indicate operation outputs, while hollow boxes indicate copied data.

3D segmentation networks require much more computational resources than 2D networks. Thus, the architecture of FIG. 1 provides accurate segmentation and fast convergence with respect to limited resources. Network 100 comprises encoding path 101 and decoding path 102. The network is composed of convolutional blocks 103, each comprises k cascading 3×3×3 convolutional layers 131 of n channels associated with batch normalization (BN) and rectified linear units (ReLU). For better convergence, a skip connection 132 with a 1×1×1 convolutional layer is used in each block 103. Instead of concatenation, the two branches are added together for less memory consumption, so the block allows efficient multi-scale processing and deeper networks can be trained.

The number of channels (n) is doubled after each max pooling and is halved after each upsampling. More layers (k) are used with tensors of smaller sizes so that more abstract knowledge can be learned with feasible memory use. Feature channels from the encoding path are concatenated with the corresponding tensors in the decoding path for better convergence. A Gaussian noise layer 104 and a dropout layer 105 are included to avoid overfitting.

Deep supervision 106 is used to allow more direct back-propagation to the hidden layers for faster convergence and better accuracy. Although deep supervision significantly improves convergence, it is memory expensive, especially in 3D networks. Therefore, the tensor is omitted from the block with the most channels (Block(192, 3)) so that training can be performed on a GPU with 12 GB of memory. A final layer of 1×1×1 convolution with the softmax function provides the segmentation probabilities.

In various embodiments, a loss function is provided that improves segmentation on small structures, as shown in Equation 1.

$$L_{Exp} = \omega_{Dice} L_{Dice} + \omega_{Cross} L_{Cross} \quad \text{Equation 1}$$

In Equation 1, $\omega_{Dice}$ and $\omega_{Cross}$ are the respective weights of the exponential logarithmic Dice loss ($L_{Dice}$) and the weighted exponential cross-entropy ($L_{cross}$) as in Equation 2 and Equation 3, where x is the pixel position, i is the label, and l is the ground-truth label at x. $E[\bullet]$ is the mean value with respect to i and x in $L_{Dice}$ and $L_{Cross}$, respectively. $\delta_{il}(x)$ is the Kronecker delta which is 1 when i=l and 0 otherwise. $p_i(x)$ is the softmax probability that acts as the portion of pixel x owned by label i when computing $Dice_i$. $\epsilon=1$ is the pseudocount for additive smoothing to handle missing labels in training samples. $\omega_l = ((\Sigma_k f_k)/f_l)^{0.5}$, with $f_k$ being the frequency of label k, is the label weight for reducing the influences of more frequently seen labels. $\gamma_{Dice}$ and $\gamma_{Cross}$ further control the nonlinearities of the loss functions, and $\gamma_{Dice} = \gamma_{Cross} = \gamma$ here for simplicity.

$$L_{Dice} = E[(-\ln(Dice_i))^{\gamma_{Dice}}] \text{ with} \quad \text{Equation 2}$$

$$Dice_i = \frac{2\left(\sum_x \delta_{il}(x) p_i(x)\right) + \epsilon}{\left(\sum_x \delta_{il}(x) + p_i(x)\right) + \epsilon}$$

$$L_{Cross} = E[w_l(-\ln(p_l(x)))^{\gamma_{Cross}}] \quad \text{Equation 3}$$

The Dice coefficient is unfavorable to small structures, as misclassifying a few pixels can lead to a large decrease of the coefficient. The use of label weights cannot alleviate such sensitivity, as it is irrelevant to the relative object sizes, and the Dice coefficient is an already normalized metric. Therefore, instead of size differences, embodiments of the present disclosure use the logarithmic Dice loss, which focuses more on less accurate labels.

Figure 2:
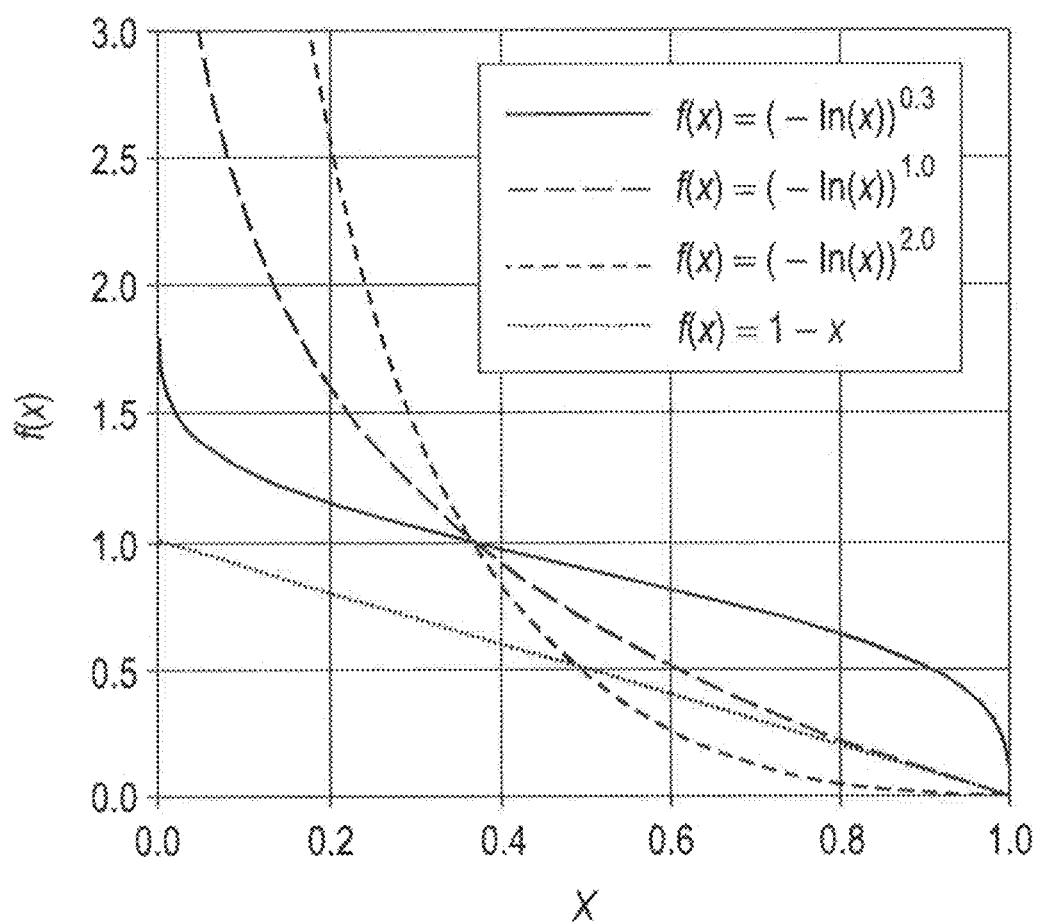
FIG. 2 is a graph of loss functions with different nonlinearities according to embodiments of the present disclosure.

FIG. 2 is a graph of Loss functions with different non-linearities, where x can be $Dice_i$ or $p_l(x)$. FIG. 2 shows a comparison between the linear ($E[1-Dice_i]$) and logarithmic Dice loss.

Further control on the nonlinearities of the losses is provided by introducing the exponents $\gamma_{Dice}$ and $\gamma_{Cross}$. With $\gamma>1$, the loss focuses more on less accurate labels than the logarithmic loss. Although the focal loss works well for two-class image classification, results are not as good when applying a segmentation problem with 20 labels. This is caused by the over-suppression of the loss function when the label accuracy becomes high. In contrast, better results are obtained with $0<\gamma<1$. FIG. 2 shows that when $\gamma=0.3$, there is an inflection point around x=0.5, where x can be $Dice_i$ or $p_l(x)$. For x<0.5, this loss behaves similarly to the losses with $\gamma \geq 1$ with decreasing gradient magnitude as x increases. This trend reverses for x>0.5 with increasing gradient magnitude. In consequence, this loss encourages improvements at both low and high prediction accuracies.

An alternative approach would be to introduce a modulating factor, $(1-p_l)^\gamma$, is multiplied by the weighted cross-entropy to become $w_l(1-p_l)^\gamma(-\ln(p_l))$ for two-class image classification. Apart from balancing the label frequencies using the label weights $w_l$, this focal loss also balances between easy and hard samples. However, such an approach does not encourage improvements at both low and high prediction accuracies. Accordingly, the exponential form described above is used instead.

In an exemplary embodiment, image augmentation is used to learn invariant features and avoid overfitting. As realistic non-rigid deformation is difficult to implement and computationally expensive, the augmentation in some embodiments is limited to rigid transformations including rotation (axial, ±30°), shifting (±20%), and scaling ([0.8, 1.2]). In the example below, each image has an 80% chance to be transformed in training, thus the number of augmented images is proportional to the number of epochs. The optimizer Adam is used with the Nesterov momentum for fast convergence, with the learning rate as 10-3, batch size as one, and 100 epochs. A TITAN X GPU with 12 GB of memory is used.

In an exemplary embodiment, a dataset of 43 3D brain MR images from different patients was neuroanatomically labeled to provide the training and testing samples. The images were produced by the T1-weighted MP-RAGE pulse sequence which provides high tissue contrast. They were manually segmented by highly trained experts with the results reviewed by a consulting neuroanatomist. Each segmentation had 19 semantic labels of brain structures, thus 20 labels with background included (illustrated in Table 1). As there were various image sizes and spacings, each image was resampled to isotropic spacing using the minimum spacing, zero padded on the shorter sides to produce a cubic image, and resized to 128×128×128.

Table 1 shows that the labels were highly unbalanced. The background occupied 93.5% of an image on average. Without the background, the relative sizes of the smallest and largest structures were 0.07% and 50.24%, respectively, thus a ratio of 0.14%.

Six loss functions are considered in this example using the proposed network. The best one was applied to the V-Net architecture, thus a total of seven cases were studied. For $L_{Exp}$, $w_{Dice}=0.8$ and $w_{Cross}=0.2$, which provided the best results. Five sets of data were generated by shuffling and splitting the dataset, with 70% for training and 30% for testing in each set. Experiments were performed on all five sets of data for each case studied for more statistically sound results. The Dice coefficients, rather than the $Dice_i$ in Equation 2, were computed for each testing image. Identical setup and training strategy were used in all experiments.

Table 1 shows semantic labels and their relative sizes (%) on average without the background. CVL represents cerebellar vermal lobules. The background occupied 93.5% of an image on average.

When applying the best loss function to the V-Net, its performance was only better than the linear Dice loss and $L_{Exp}(\gamma=2)$. This shows that the networks described herein perform better than the V-Net on this problem.

TABLE 1

| 1. Cerebral grey | (50.24) | 2. 3rd ventricle | (0.09) | 3. 4th ventricle | (0.15) | 4. Brainstem | (1.46) |
|---|---|---|---|---|---|---|---|
| 5. CVL I-V | (0.39) | 6. CVL VI-VII | (0.19) | 7. CVL VIII-X | (0.26) | 8. Accumbens | (0.07) |
| 9. Amygdala | (0.21) | 10. Candate | (0.54) | 11. Cerebellar grey | (8.19) | 12. Cerebellar white | (2.06) |
| 13. Cerebral white | (31.23) | 14. Hippocampus | (0.58) | 15. Inf. lateral vent. | (0.09) | 16. Lateral ventricle | (2.11) |
| 17. Pallidum | (0.25) | 18. Putamen | (0.73) | 19. Thalamus | (1.19) | | |

Table 2 shows Dice coefficients between prediction and ground truth averaged from five experiments (format: mean±std %). The best results are highlighted in blue. $w_{Dice}=0.8$ and $w_{Cross}=0.2$ for all $L_{Exp}$.

Figure 3:
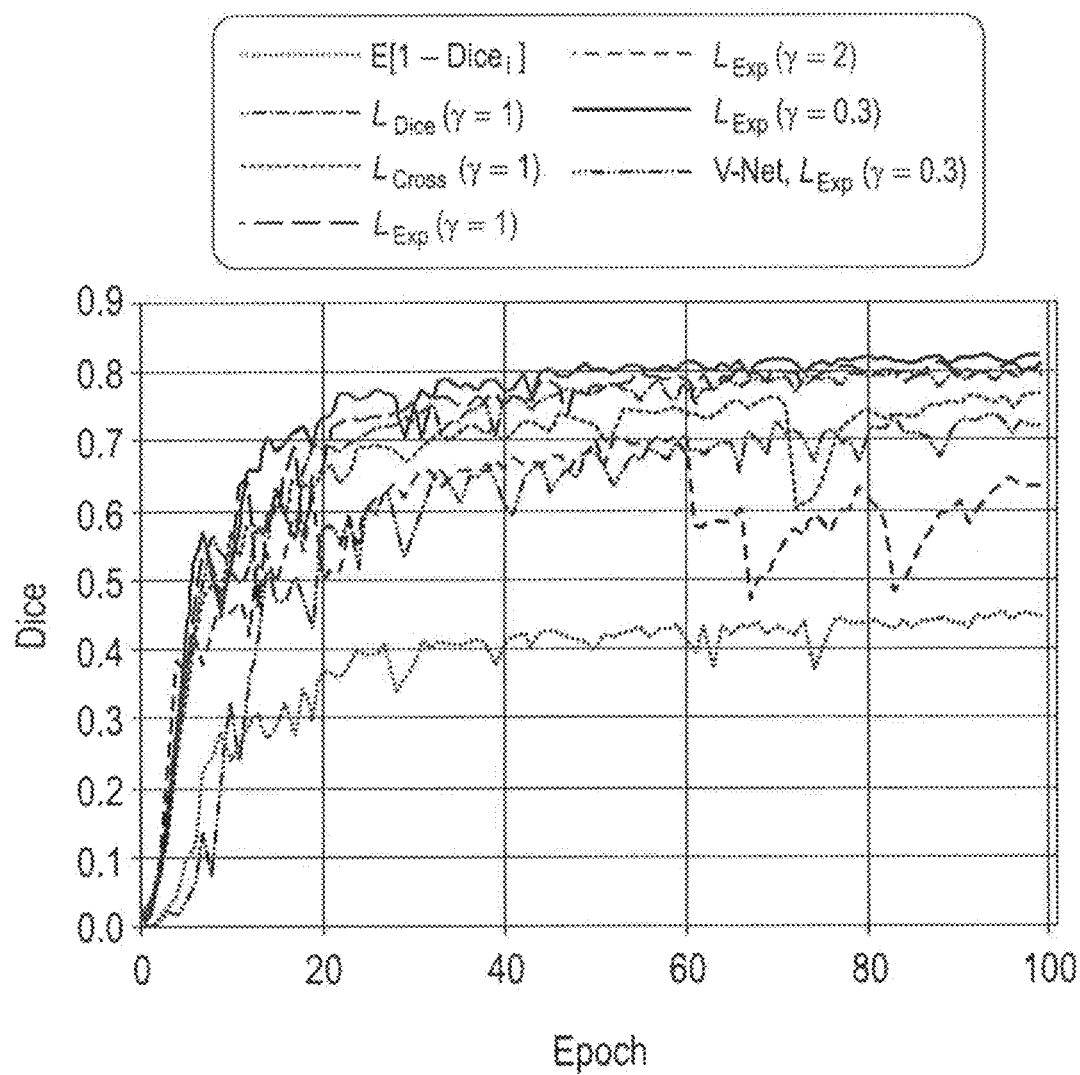
FIG. 3 is a graph showing validation Dice coefficients vs. epoch according to embodiments of the present disclosure.
Figure 4A:
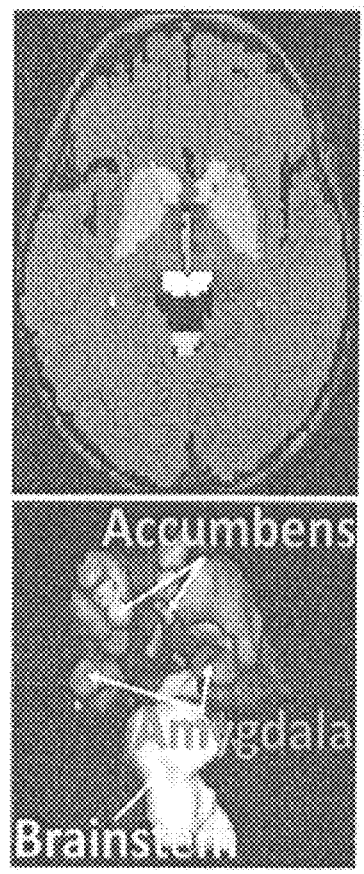
FIGS. 4A-D illustrate exemplary visualizations of segmentations according to the present disclosure.
Figure 4B:
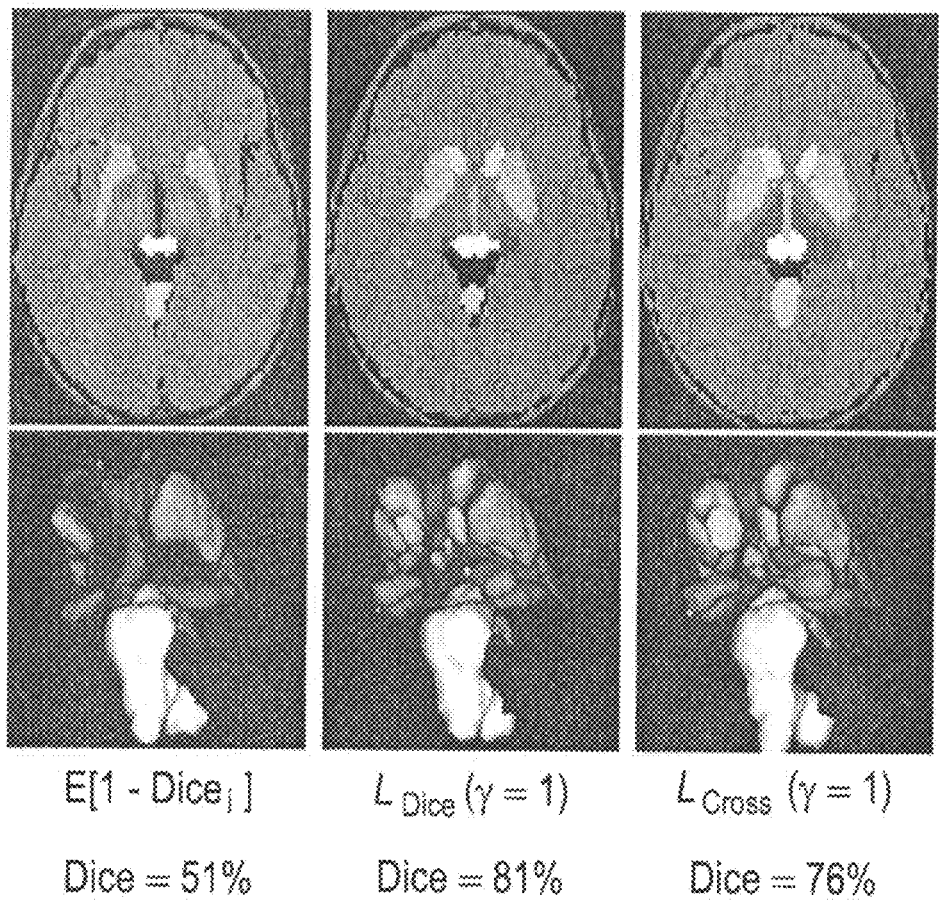
Figure 4C:
Figure 4D:
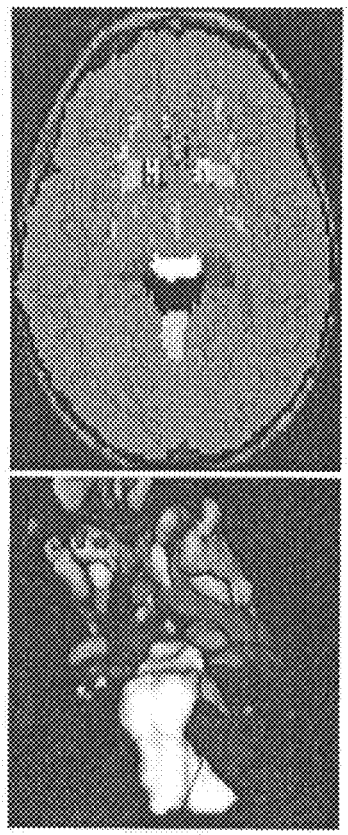

FIG. 3 is a graph showing the validation Dice coefficients vs. epoch, averaged from the five experiments. Instead of the losses, the Dice coefficients are shown as their magnitudes were consistent among cases. Similar to Table 2, the loga-

TABLE 2

Proposed network with linear Dice loss, logarithmic Dice loss, and weighted cross-entropy

| | | | | | | | |
|---|---|---|---|---|---|---|---|
| $E[1 - Dice_i]$ (2) | 1. 87 ± 1 | 2. 47 ± 38 | 3. 32 ± 40 | 4. 72 ± 36 | 5. 50 ± 41 | 6. 30 ± 37 | 7. 31 ± 38 |
| | 8. 0 ± 0 | 9. 0 ± 0 | 10. 34 ± 42 | 11. 88 ± 1 | 12. 86 ± 1 | 13. 88 ± 1 | 14. 32 ± 39 |
| | 15. 0 ± 0 | 16. 54 ± 44 | 17. 0 ± 0 | 18. 51 ± 42 | 19. 35 ± 43 | Average: 43 ± 11 | |
| $L_{Dice}(\gamma = 1)$ (2) | 1. 84 ± 1 | 2. 61 ± 30 | 3. 83 ± 2 | 4. 96 ± 1 | 5. 81 ± 2 | 6. 73 ± 2 | 7. 76 ± 2 |
| | 8. 68 ± 2 | 9. 74 ± 2 | 10. 85 ± 1 | 11. 87 ± 1 | 12. 85 ± 1 | 13. 88 ± 1 | 14. 79 ± 2 |
| | 15. 59 ± 3 | 16. 89 ± 1 | 17. 79 ± 1 | 18. 86 ± 2 | 19. 88 ± 1 | Average: 80 ± 2 | |
| $L_{Cross}(\gamma = 1)$ (3) | 1. 87 ± 1 | 2. 56 ± 5 | 3. 79 ± 3 | 4. 86 ± 2 | 5. 76 ± 3 | 6. 67 ± 2 | 7. 73 ± 6 |
| | 8. 59 ± 4 | 9. 65 ± 4 | 10. 83 ± 2 | 11. 87 ± 2 | 12. 85 ± 1 | 13. 89 ± 1 | 14. 75 ± 3 |
| | 15. 54 ± 6 | 16. 89 ± 1 | 17. 76 ± 3 | 18. 84 ± 1 | 19. 86 ± 1 | Average: 77 ± 2 | |
| Proposed network with $L_{Exp}$ at different values of $\gamma$ | | | | | | | |
| $L_{Exp}(\gamma = 1)$ (1) | 1. 87 ± 2 | 2. 78 ± 3 | 3. 84 ± 1 | 4. 90 ± 1 | 5. 82 ± 1 | 6. 74 ± 2 | 7. 78 ± 3 |
| | 8. 68 ± 3 | 9. 75 ± 1 | 10. 83 ± 3 | 11. 87 ± 1 | 12. 86 ± 0 | 13. 89 ± 1 | 14. 80 ± 1 |
| | 15. 64 ± 1 | 16. 90 ± 1 | 17. 80 ± 2 | 18. 86 ± 2 | 19. 88 ± 1 | Average: 81 ± 1 | |
| $L_{Exp}(\gamma = 2)$ (1) | 1. 79 ± 7 | 2. 61 ± 15 | 3. 74 ± 6 | 4. 75 ± 10 | 5. 67 ± 12 | 6. 62 ± 8 | 7. 66 ± 10 |
| | 8. 52 ± 17 | 9. 56 ± 15 | 10. 64 ± 12 | 11. 78 ± 8 | 12. 78 ± 7 | 13. 84 ± 4 | 14. 64 ± 11 |
| | 15. 46 ± 10 | 16. 77 ± 10 | 17. 60 ± 16 | 18. 67 ± 15 | 19. 67 ± 15 | Average: 67 ± 11 | |
| $L_{Exp}(\gamma = 0.3)$ (1) | 1. 88 ± 1 | 2. 77 ± 2 | 3. 84 ± 1 | 4. 91 ± 1 | 5. 82 ± 1 | 6. 74 ± 1 | 7. 78 ± 2 |
| | 8. 69 ± 2 | 9. 75 ± 2 | 10. 86 ± 1 | 11. 89 ± 1 | 12. 86 ± 1 | 13. 89 ± 0 | 14. 81 ± 1 |
| | 15. 62 ± 5 | 16. 91 ± 1 | 17. 80 ± 1 | 18. 87 ± 1 | 19. 89 ± 1 | Average: 82 ± 1 | |
| V-Net with the best $L_{Exp}$ at $\gamma = 0.3$ | | | | | | | |
| V-Net | 1. 84 ± 2 | 2. 67 ± 7 | 3. 80 ± 4 | 4. 87 ± 4 | 5. 78 ± 3 | 6. 67 ± 5 | 7. 73 ± 6 |
| $L_{Exp}(\gamma = 0.3)$ (1) | 8. 59 ± 7 | 9. 65 ± 5 | 10. 72 ± 5 | 11. 85 ± 2 | 12. 82 ± 4 | 13. 86 ± 2 | 14. 72 ± 7 |
| | 15. 48 ± 8 | 16. 82 ± 6 | 17. 70 ± 7 | 18. 75 ± 6 | 19. 78 ± 6 | Average: 74 ± 4 | |

Table 2 shows the Dice coefficients averaged from the five experiments. The linear Dice loss ($E[1-Dice_i]$) had the worst performance. It performed well with the relatively large structures such as the gray and white matters, but the performance decreased with the sizes of the structures. The very small structures, such as the nucleus accumbens and amygdala, were missed in all experiments. In contrast, the logarithmic Dice loss ($L_{Dice}(\gamma=1)$) provided much better results, though the large standard deviation of label 2 indicates that there were misses. Experiments were also performed with the weighted cross-entropy ($L_{Cross}(\gamma=1)$), whose performance was better than the linear Dice loss but worse than the logarithmic Dice loss. The weighted sum of the logarithmic Dice loss and weighted cross-entropy ($L_{Exp}(\gamma=1)$) outperformed the individual losses, and it provided the second best results among the tested cases. As described above, $L_{Exp}(\gamma=2)$ was ineffective even on larger structures. This is consistent with the observation in FIG. 2 that the loss function is over suppressed when the accuracy getting higher. In contrast, $L_{Exp}(\gamma=0.3)$ gave the best results. Although it only performed slightly better than $L_{Exp}(\gamma=1)$ in terms of the means, the smaller standard deviations indicate that it was also more precise.

rithmic Dice loss, $L_{Exp}(\gamma=1)$, and $L_{Exp}(\gamma=0.3)$ had good convergence and high accuracy, with $L_{Exp}(\gamma=0.3)$ performed slightly better. These three cases converged at about 80 epochs. The weighted cross-entropy and $L_{Exp}(\gamma=2)$ were more fluctuating. The linear Dice loss also converged at about 80 epochs but with a much smaller Dice coefficient. Comparing between the V-Net and the network with $L_{Exp}(\gamma=0.3)$, the V-Net had worse convergence especially at the earlier epochs. This shows that networks described herein had better convergence.

FIG. 4 provides exemplary visualizations of a segmentation according to the present disclosure. In each of FIGS. 4A-D, the top half provides an axial view, and the bottom half provides a 3D view with the cerebral grey, cerebral white, and cerebellar grey matters hidden for better illustration. In these figures, consistent with Table 2, the linear Dice loss missed some small structures such as the nucleus accumbens and amygdala, although it performed well on large structures. The segmentation of the V-Net deviated significantly from the ground truth. The logarithmic Dice loss, $L_{Exp}(\gamma=1)$, and $L_{Exp}(\gamma=0.3)$ had the best segmentation and average Dice coefficients. The weighted cross-entropy had the same average Dice coefficient as $L_{Exp}(\gamma=2)$, although the weighted cross-entropy over-segmented some structures such as the brainstem, and $L_{Exp}(\gamma=2)$ had noisier segmentation.

Comparing the efficiencies between the network described herein and the V-Net, the present network had around 5 million parameters while the V-Net had around 71 million parameters, a 14-fold difference. Furthermore, the network only took about 0.4 s on average to segment a 128×128×128 volume, while the V-Net took about 0.9 s. Therefore, the network was more efficient.

Figure 5:
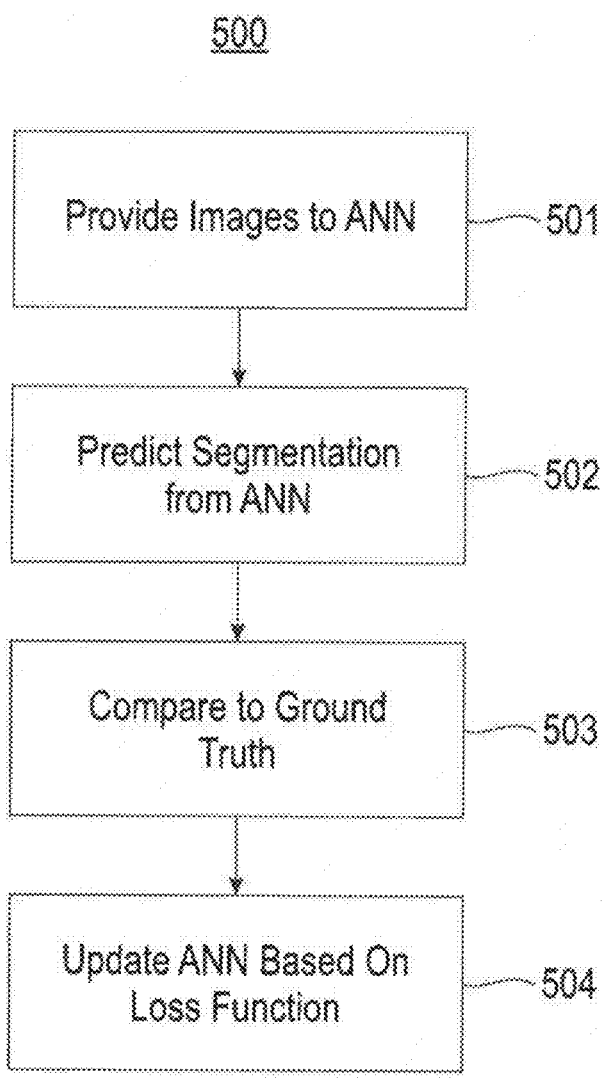
FIG. 5 illustrates a method of labeling anatomical features in medical imagery according to embodiments of the present disclosure.

Referring to FIG. 5, a method of training an artificial neural network to label an anatomical feature in medical imagery is illustrated according to embodiments of the present disclosure. At 501, at least one medical image is provided to the artificial neural network. At 502, a predicted segmentation for the at least one medical image is determined from the artificial neural network. At 503, the predicted segmentation is compared to ground truth segmentation. A loss function is computed therefrom. The loss function has an exponential-logarithmic term. At 504, the artificial neural network is updated based on the loss function.

Although various exemplary computations are provided above, it will be appreciated that, more generally, the present disclosure provides that scores, such as Dice coefficients, Jaccard distances, or probabilities of the ground truth labels are computed using the network outputs and the ground truth. The loss function is a nonlinear function that maps the scores to loss values. The loss function guides the network weights update to achieve desired network outputs, such as outputs that can lead to accurate segmentation of internal body parts. The speed of weights update depends on the gradient of the loss function.

In the example described above, in which $\gamma=0.3$, when the scores are smaller than 50% of the maximum score, the loss function has a decreasing gradient magnitude. When the scores are larger than 50% of the maximum score, the loss function has an increasing gradient magnitude. Therefore, the loss function encourages faster weights update when the scores are small or large. This leads to more accurate segmentation for the internal body parts that are more difficult to segment, such as the ones with small sizes, while not affecting the segmentation accuracy of the others.

As set out above, a network architecture is provided that is optimized for 3D image segmentation. A loss function is provided for segmenting very small structures. The proposed network architecture has only about 1/14 of the parameters of, and is twice as fast as, the V-Net. For the loss function, the logarithmic Dice loss outperforms the linear Dice loss, and the weighted sum of the logarithmic Dice loss and the weighted cross-entropy outperforms the individual losses. With the introduction of the exponential form, the nonlinearities of the loss functions can be further controlled to improve the accuracy and precision of segmentation.

Various embodiments of the present disclosure use a convolutional neural network. However, it will be appreciated that the loss function described herein is useful in a variety of neural network systems.

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

Various algorithms may be used for this learning process. Certain algorithms may be suitable for specific tasks such as image recognition, speech recognition, or language processing. Training algorithms lead to a pattern of synaptic weights that, during the learning process, converges toward an optimal solution of the given problem. Backpropagation is one suitable algorithm for supervised learning, in which a known correct output is available during the learning process. The goal of such learning is to obtain a system that generalizes to data that were not available during training.

In general, during backpropagation, the output of the network is compared to the known correct output. An error value is calculated for each of the neurons in the output layer. The error values are propagated backwards, starting from the output layer, to determine an error value associated with each neuron. The error values correspond to each neuron's contribution to the network output. The error values are then used to update the weights. By incremental correction in this way, the network output is adjusted to conform to the training data.

When applying backpropagation, an ANN rapidly attains a high accuracy on most of the examples in a training-set. The vast majority of training time is spent trying to further increase this test accuracy. During this time, a large number of the training data examples lead to little correction, since the system has already learned to recognize those examples. While in general, ANN performance tends to improve with the size of the data set, this can be explained by the fact that larger data-sets contain more borderline examples between the different classes on which the ANN is being trained.

Figure 6:
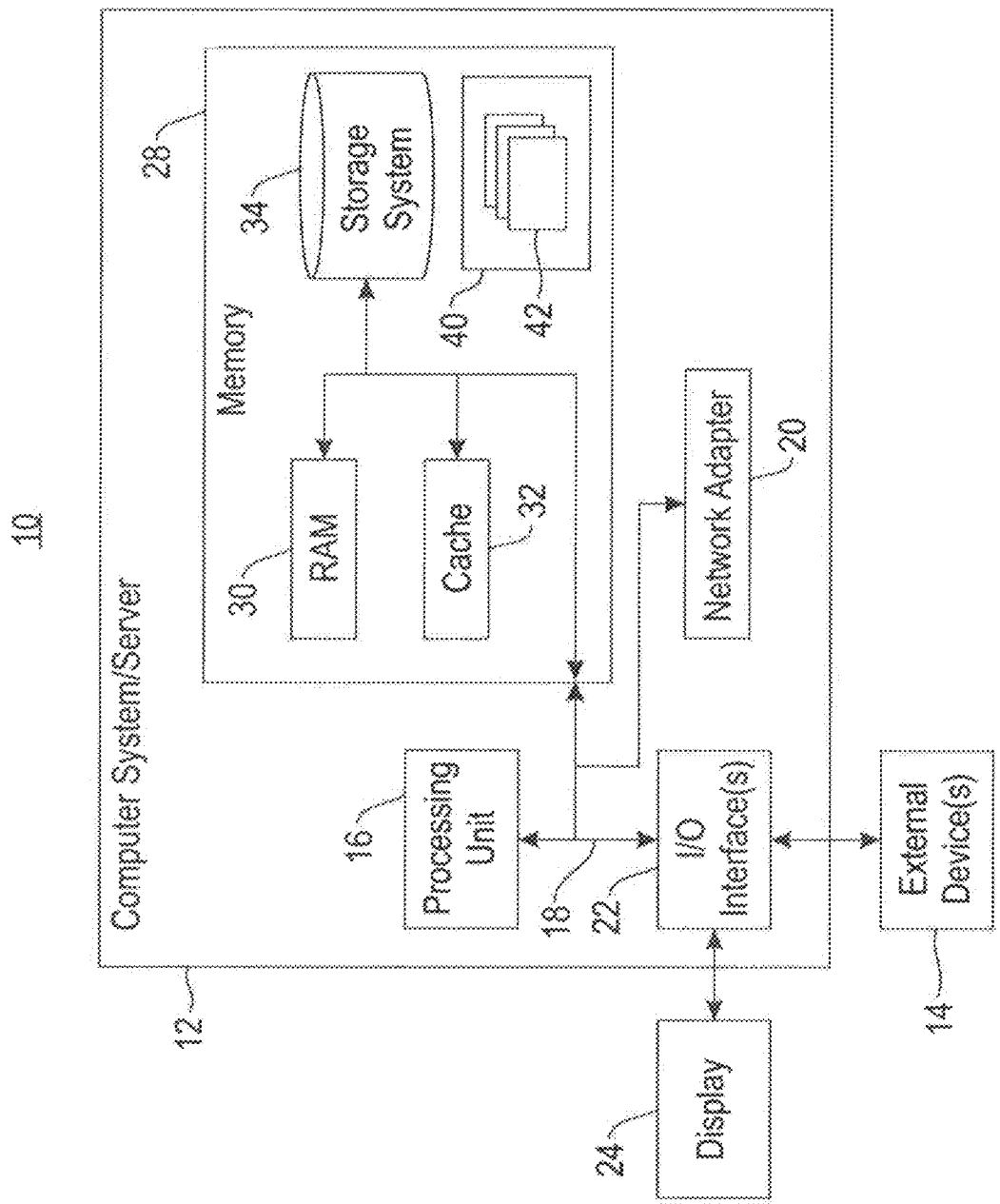
FIG. 6 depicts a computing node according to an embodiment of the present disclosure.

Referring now to FIG. 6, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    training an artificial neural network to label at least one anatomical feature in medical imagery by:
    i) providing at least one medical image to the artificial neural network;
    ii) determining from the artificial neural network a predicted segmentation for the at least one medical image;
    iii) comparing the predicted segmentation to ground truth segmentation, and computing therefrom a loss function, the loss function having an exponential-logarithmic term, in which a logarithmic expression is raised to an exponent; and
    iv) updating the artificial neural network based on the loss function.

2. The method of claim 1, further comprising:
    repeating said training for a predetermined number of cycles.

3. The method of claim 1, wherein the artificial neural network comprises a convolutional neural network having one or more synaptic weights, and updating the artificial neural network comprises updating the one or more synaptic weights.

4. The method of claim 1, wherein computing the loss function comprises computing a logarithmic Dice loss.

5. The method of claim 1, further comprising:
    applying the artificial neural network to an input image;
    determining from the artificial neural network a segmentation of the input image.

6. The method of claim 1, wherein said updating comprises back-propagation.

7. The method of claim 1, wherein the artificial neural network comprises a plurality of convolutional blocks, each comprising skip connection.

8. The method of claim 1, wherein the artificial neural network comprises deep supervision.

9. The method of claim 1, wherein the exponential-logarithmic term has an exponent between zero and one.

10. A system comprising:
    a computing node comprising a computer readable storage medium having program instructions embodied therewith, the program instructions executable by a processor of the computing node to cause the processor to train an artificial neural network to label at least one anatomical feature in medical imagery by:
    i) providing at least one medical image to the artificial neural network;
    ii) determining from the artificial neural network a predicted segmentation for the at least one medical image;

iii) comparing the predicted segmentation to ground truth segmentation, and computing therefrom a loss function, the loss function having an exponential-logarithmic term, in which a logarithmic expression is raised to an exponent; and iv) updating the artificial neural network based on the loss function.

11. The system of claim 10, the method further comprising:

repeating said training for a predetermined number of cycles.

12. The system of claim 10, wherein the artificial neural network comprises a convolutional neural network having one or more synaptic weights, and updating the artificial neural network comprises updating the one or more synaptic weights.

13. The system of claim 10, wherein computing the loss function comprises computing a logarithmic Dice loss.

14. The system of claim 10, the method further comprising:

applying the artificial neural network to an input image;
determining from the artificial neural network a segmentation of the input image.

15. The system of claim 10, wherein said updating comprises back-propagation.

16. The system of claim 10, wherein the artificial neural network comprises a plurality of convolutional blocks, each comprising skip connection.

17. The system of claim 10, wherein the artificial neural network comprises deep supervision.

18. The system of claim 10, wherein the exponential-logarithmic term has an exponent between zero and one.

19. A computer program product for labeling anatomical features in medical imagery, the computer program product comprising a computer readable storage medium having program instructions embodied therewith, the program instructions executable by a processor to cause the processor to perform a method comprising:

training an artificial neural network to label at least one anatomical feature in medical imagery by:

i) providing at least one medical image to the artificial neural network;

ii) determining from the artificial neural network a predicted segmentation for the at least one medical image;

iii) comparing the predicted segmentation to ground truth segmentation, and computing therefrom a loss function, the loss function having an exponential-logarithmic term, in which a logarithmic expression is raised to an exponent; and iv) updating the artificial neural network based on the loss function.

20. The computer program product of claim 19, the method further comprising:

applying the artificial neural network to an input image;
determining from the artificial neural network a segmentation of the input image.

* * * * *